No. 657,476. Patented Sept. 4, 1900.
G. R. BROWN.
PROPORTIONATE SCALE.
(Application filed May 29, 1900.)
(No Model.)
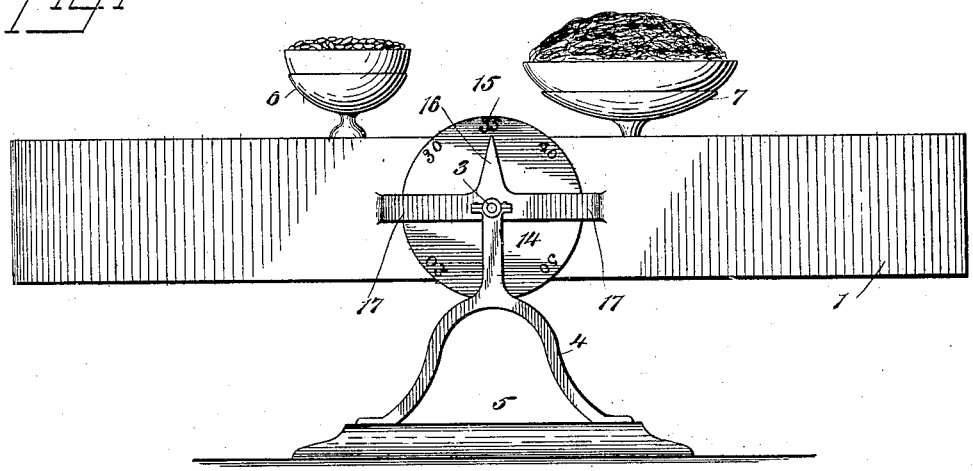
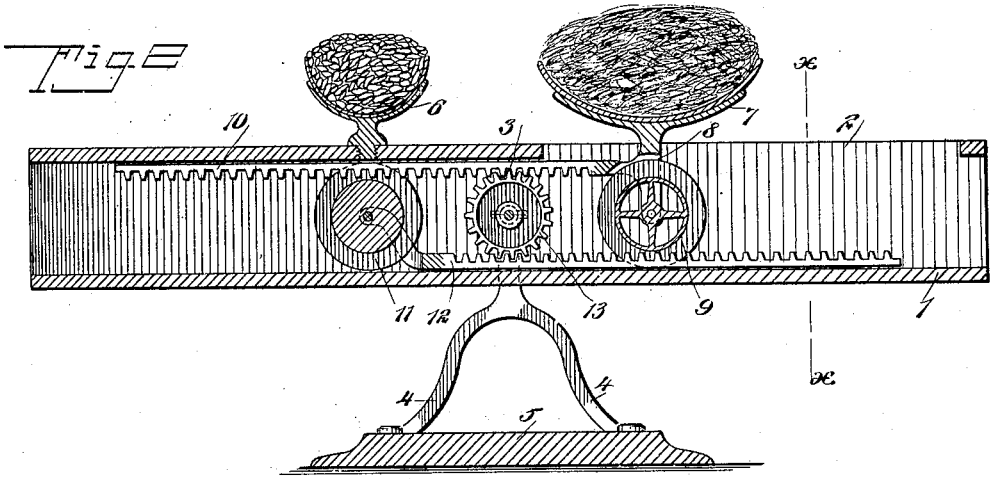
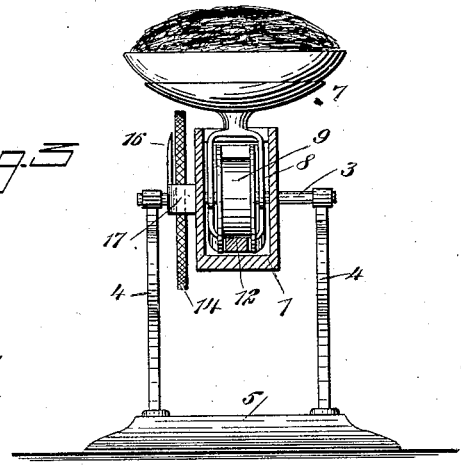
WITNESSES:
INVENTOR
George R. Brown.
BY
ATTORNEYS

United States Patent Office.

GEORGE R. BROWN, OF PLEDGER, TEXAS, ASSIGNOR OF ONE-HALF TO NATHANIEL ST. GEORGE FLOYD, OF SAME PLACE.

PROPORTIONATE SCALE.

SPECIFICATION forming part of Letters Patent No. 657,476, dated September 4, 1900.

Application filed May 29, 1900. Serial No. 18,388. (No model.)

*To all whom it may concern:*

Be it known that I, GEORGE R. BROWN, a citizen of the United States, and a resident of Pledger, in the county of Matagorda and State of Texas, have invented a new and Improved Proportionate Scale, of which the following is a full, clear, and exact description.

This invention relates to improvements in scales for determining the relative proportion or percentage of a product and the tare or waste, and a main object is to provide a scale of simple construction for the use of ginners in buying cotton-seed and to enable a purchaser to determine the percentage of lint contained in the seed-cotton offered for sale.

I will describe a proportionate scale embodying my invention and then point out the novel features in the appended claims.

Reference is to be had to the accompanying drawings, forming a part of this specification, in which similar characters of reference indicate corresponding parts in all the figures.

Figure 1 is a side elevation of a proportionate scale embodying my invention. Fig. 2 is a sectional side elevation thereof, and Fig. 3 is a transverse section on the line $xx$ of Fig. 2.

The scale comprises a balance-beam 1, which is made tubular or in the form of a box, the top of which, at one end, however, is removed, as at 2. This beam 1 is mounted to rock on a shaft 3, which has bearings in supports 4, extended upward from a base 5. Rigidly attached to the beam 1 at one side of its fulcrum-point is a tray 6, and movable lengthwise of the beam at the opposite side of its fulcrum-point is a tray 7 for receiving tare or lint. This tray 7 has downwardly-extended arms 8, in which the spindles of a grooved roller 9 have bearings. Extended from the arms 8 and lengthwise of the beam, at the upper portion thereof, is a rack 10, which passes over a roller 11, from the spindles of which a rack 12 extends along the bottom of the beam and underneath the roller 9. The roller 11 is flanged like the roller 9. Therefore these rollers, with the racks, serve not only as a means for moving the tray 7, but also as a guide therefor. The roller 11 is made solid, while the roller 9 is made in spoke form. Therefore the roller 11 further serves as a counterpoise for the tray 7 and its supporting-roller 9.

A pinion 13 is mounted on the shaft 3 and meshes with the racks 10 and 12, and connected to the shaft 3 at the outer side of the beam is a hand-wheel 14, on the outer face of which are figures 15, designed to indicate the proportion or percentage of the two articles in the trays 6 and 7. Coacting with these numbers is a pointer 16, which is supported on arms 17, connected to one side of the scale-beam. It is obvious that by rotating the wheel 14 the counterpoise 11 and the tray 7 may be caused to move toward or from each other, as desired, to balance.

As the rate of lint to the seed-cotton is from twenty-five to forty per cent., the construction of the scale is such as to indicate the percentage between twenty-five and fifty per cent. for the purpose of making the scale as compact as possible.

The operation is as follows: The ginner, to whom is offered a wagon-load of seed-cotton, takes a small quantity—for instance, a handful—and with the aid of a small hand-gin separates the lint from the seed, placing the seeds, with the hulls and dirt, in the fixed pan 6, and then placing the lint in the pan 7. Then the hand-wheel is to be turned until the equilibrium is established. He can then read from the index-plate, say, thirty-three per cent., showing that the seed-cotton contains thirty-three pounds of lint per hundred pounds of seed-cotton, and thus the actual lint product of the load may be definitely ascertained.

Having thus described my invention, I claim as new and desire to secure by Letters Patent—

1. A proportionate scale, comprising a balance-beam, a tray fixedly supported on said beam, a tray movable along said beam, a roller supporting the tray, a rack extended from said movable tray, a counterpoise-roller movable in the beam, a rack extended from said counterpoise-roller, a pinion engaging with said rack, and a hand-wheel on the shaft of said pinion, said hand-wheel being provided with a scale, substantially as specified.

2. A proportionate scale, comprising a hollow balance-beam, a tray attached to said beam at one side of its fulcrum-point, a tray movable along the beam at the opposite side of its fulcrum-point, a grooved roller on which said movable tray is mounted, a rack extended from said movable tray, a grooved counterpoise-roller movable in the beam, a rack extended from said counterpoise-roller and underneath the first-named roller, a pinion engaging with said racks, a hand-wheel mounted on the shaft of said pinion and having gage-marks on its outer surface, and a pointer carried by the beam for coacting with said scale, substantially as specified.

In testimony whereof I have signed my name to this specification in the presence of two subscribing witnesses.

GEORGE R. BROWN.

Witnesses:
Z. A. TAYLOR,
N. G. FLOYD.